March 18, 1952  C. BARNETT ET AL  2,589,762
POTATO FEEDING MACHINE

Filed Aug. 22, 1949  5 Sheets-Sheet 1

Inventor
Charles Barnett
and William Barnett
Attorneys

March 18, 1952 C. BARNETT ET AL 2,589,762
POTATO FEEDING MACHINE
Filed Aug. 22, 1949 5 Sheets-Sheet 2

Inventor
Charles Barnett
and William Barnett
By Emery, Holcombe & Blair
Attorneys

March 18, 1952 C. BARNETT ET AL 2,589,762
POTATO FEEDING MACHINE
Filed Aug. 22, 1949 5 Sheets-Sheet 3

Inventor
Charles Barnett
and William Barnett
By Emery, Halcombe Blair
Attorneys

March 18, 1952  C. BARNETT ET AL  2,589,762
POTATO FEEDING MACHINE
Filed Aug. 22, 1949  5 Sheets-Sheet 5

Inventor
Charles Barnett
and William Barnett
By Emery, Holcombe & Blair
Attorneys

UNITED STATES PATENT OFFICE 2,589,762

POTATO FEEDING MACHINE

Charles Barnett and William Barnett,
Hatfield, England

Application August 22, 1949, Serial No. 111,635
In Great Britain August 24, 1948

19 Claims. (Cl. 198—54)

This invention relates to potato planting machines whereby seed potatoes supplied in bulk to the machine may be planted at regular spacings along a row or along parallel rows simultaneously as the machine is caused to traverse the land.

According to the present invention, there is provided a potato planting machine comprising a potato hopper having an inclined bottom plate which forms a chute leading to the hopper outlet and which is movable transversely to its direction of feed, an inclined trough forming a chute leading from beneath the hopper outlet and having a plate which forms the bottom of the trough and which is movable transversely of the trough, the trough leading to a device at its discharge end which is operable for passing or conveying the potatoes singly and in spaced succession in one or more lines to one or more discharge outlets of the machine, and driving mechanism for reciprocating said plates transversely and for operating said device. Preferably, the hopper bottom plate and trough bottom plate are reciprocated in opposite phase.

The reciprocation of these plates assists in obtaining a free flow of the potatoes from the hopper to the discharge end of the trough, and in preventing the potatoes from bunching or piling up, or sticking if they are muddy. The reciprocation of the trough bottom plate serves also to shake the potatoes into a single layer preparatory to their being taken off at the discharge end of the trough.

Preferably, the bottom plate of the trough terminates at a point spaced a short distance from the discharge end of the trough, from which point a short auxiliary bottom plate extends in series with the main bottom plate to the discharge end of the trough, this auxiliary plate being also transversely movable and being adapted for transverse reciprocation by a driving mechanism therefor, at a different phase and/or rate from, preferably in opposite phase to the reciprocation of the maain bottom plate of the trough. This auxiliary plate assists in preventing jamming of the potatoes at the discharge end of the trough where the flow of the potatoes is likely to be checked by reason of their being passed out singly in one or more lines.

The hopper outlet is preferably made adjustable in size to suit the average size of the potatoes being dealt with at the time. For this purpose, a portion of the hopper wall which, together with the hopper bottom plate, defines the hopper outlet is made movable so that it can be adjusted to vary the size of the outlet.

Other aspects and features of the invention will become apparent from the following description of a specific embodiment and some modifications thereof, it being, however, understood that the embodiment is only given by way of example.

In the accompanying drawings:

Fig. 4 is a plan view without the hopper.

Figs. 10, 11 and 12 are details of the trough substantially in section along lines X—X, XI—XI, and XII—XII, respectively, of Fig. 1.

Referring now to the drawing, the machine has a hopper provided with a hopper bottom plate 1 and with a wall plate 2 disposed opposite and sloping downwardly towards the hopper bottom plate 1, the wall plate 2 terminating with its lower edge above the lower end of the hopper bottom plate so as to form therebetween a gap defining the hopper outlet and leading to a trough 3. The wall plate 2 is hinged at its upper end 4 to the hopper structure and rests in an inclined position upon a support which is adjustable for adjusting the inclination of the plate. The wall plate may lie over a well 5 formed in the hopper structure to allow for lowering the plate, and the adjustable support may comprise a pair of rods or bolts 6, upon the ends or heads of which the plate 2 rests, and which are screw-threaded into a bar 7 extending across the well so that they can be screwed in or out to lower or raise the hinged wall plate 2. The bolts 6 may be fitted with lock nuts to fix them in adjusted position.

Preferably, the trough bottom is a plate 8 inclined in an opposite direction to that of the hopper bottom 1 so that the flow of the potatoes is reversed when passing from the hopper bottom plate 1 to the trough 3, and the upper end of the trough is fenced to deflect on to the trough the potatoes dropping off the lower edge of the hopper bottom plate 1. Preferably, an adjustable fence is provided so that it can be adjusted longitudinally of the trough 3 to vary the gap between the fence and the lower edge of the hopper bottom plate 1, through which the potatoes drop on to the trough. This adjustable fence may comprise a plate 9 supported, for instance substantially perpendicularly to the trough, between hte side walls of the hopper well 5, by a pair of bolts 10 fixed to the fence plate 9 and extending through a bracket plate 11 secured to the bottom of the well 5 adjusting nuts 12 being mounted on the bolts at each side of the bracket plate 11 so that the fence plate 9 is longitudinally adjustable and can be locked by the nuts 12 in adjusted position.

With the adjustable hopper wall plate 2 and the adjustable fence plate 9 as described, the hopper outlet and the inlet gap to the trough 3 can be adjusted through a wide range of combinations to suit the average size and the condition (clean or earth-caked, dry or wet) of the potatoes in the hopper and to regulate their flow on to the trough 3.

The bottom of the trough 3, beyond the end of the main bottom plate 8, is continued by a shorter auxiliary bottom plate 13, and the three bottom plates 1, 8, and 13 are arranged to reciprocate transversely, the plate 8 moving in phase opposition to the plates 1 and 13.

The main bottom plate 8 of the trough may be formed with a preferably slight bump or step near its lower end, which acts as a brake to retard the flow of the potatoes on to the auxiliary bottom plate of the trough, and a series of such brakes may be spaced along the trough. In a modification, the brake or brakes may be constituted by an adjustable hump or step member or members capable of being raised and lowered in the bottom of the trough and having suitable means for fixing the member or members in adjusted position. For example, an angle or arched plate, or a series of such plates, may be disposed transversely in the trough, so that the (or each) plate has one edge thereof adjacent, or resting upon, or hinged to, the face of the main bottom plate of the trough, and extends through a transverse slot in the trough bottom plate so that the other edge portion of the brake plate protrudes beneath the trough bottom plate, this protruding portion being adjustably supported so that it can be raised and lowered to adjust the brake plate relatively to the trough bottom plate.

In the illustrated embodiment, the trough is provided, in the vicinity of the lower end of its main bottom plate 8, with a movable transverse stop plate 15 which can be moved by a hand lever 16 into position to reduce or stop the flow of potatoes on to the auxiliary bottom plate 13 of the trough should there be too free a flow.

At the discharge end of the trough, an adjustable potato outlet gate is provided to vary the size of inlet to a passage or passages each of which receives from the trough a row of potatoes in single file. In the illustrated multiple-row machine, a relatively short downwardly inclined discharge chute 14 leads from the lower end of the trough and is sub-divided longitudinally into a number of parallel channels 17 according to the number of rows that the machine is to plant, these channels may each be U-shaped as illustrated or of similar round-bottomed cross-section and of a suitable width to convey the potatoes in single file. Across the inlet end of this chute a gate is mounted so that it can be raised and lowered and fixed in adjusted position, the gate being in the form of a plate 18 having gateways 19 therein in line with the inlets to the respective channels of the chute, the sides of each gateway diverging upwardly from a point near the bottom edge of the plate so that each gateway is narrowest at its base, whereby the effective size of the channel inlets may be reduced by raising the gate, the maximum size corresponding to the lowest position of the gate. In a single-row machine, a similar form of gate having a single gateway therein may be arranged at the inlet end of a discharge chute having a single channel.

The reciprocating hopper and trough plates may each be supported outside the hopper and trough on lever arms adapted for rocking movements symmetrically to a substantially vertical plane.

Figures 1, 2:
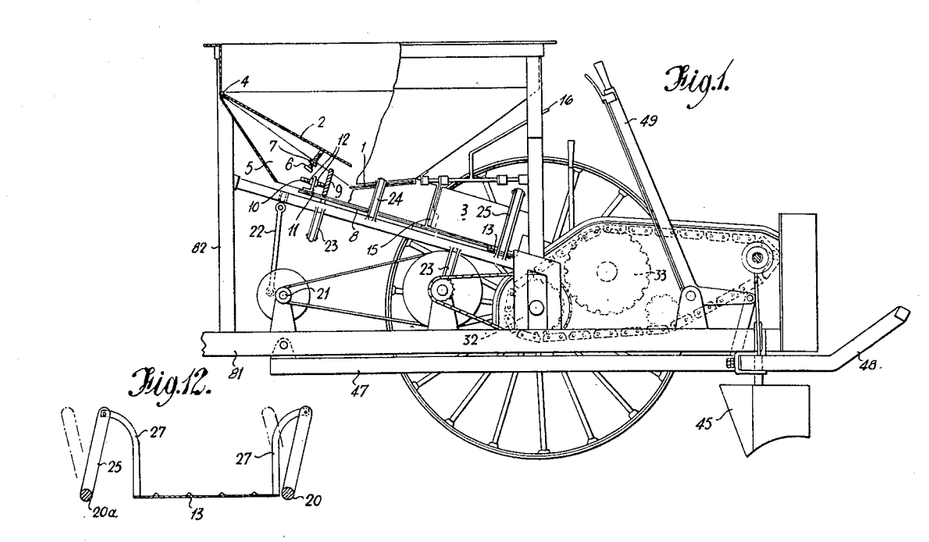
Fig. 1 is a side elevation of a preferred embodiment, partly in section.
Fig. 2 is a front elevation.
Figure 2:
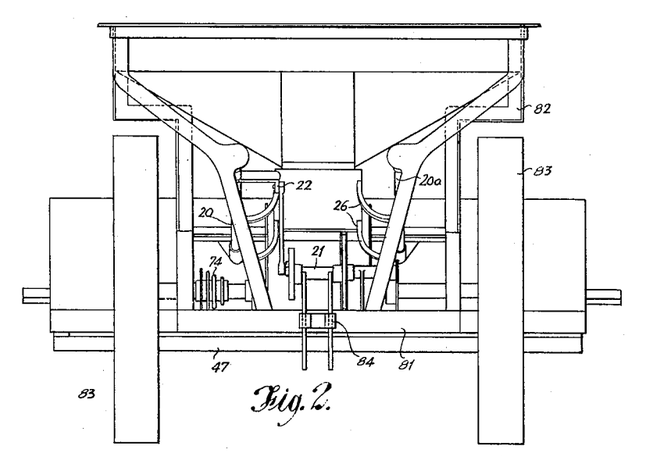
Figure 3:
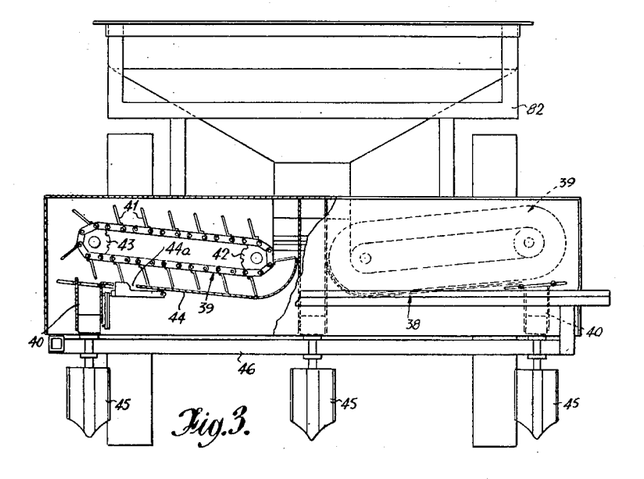
Fig. 3 is rear elevation, partly in section.
Figures 4, 10, 11:
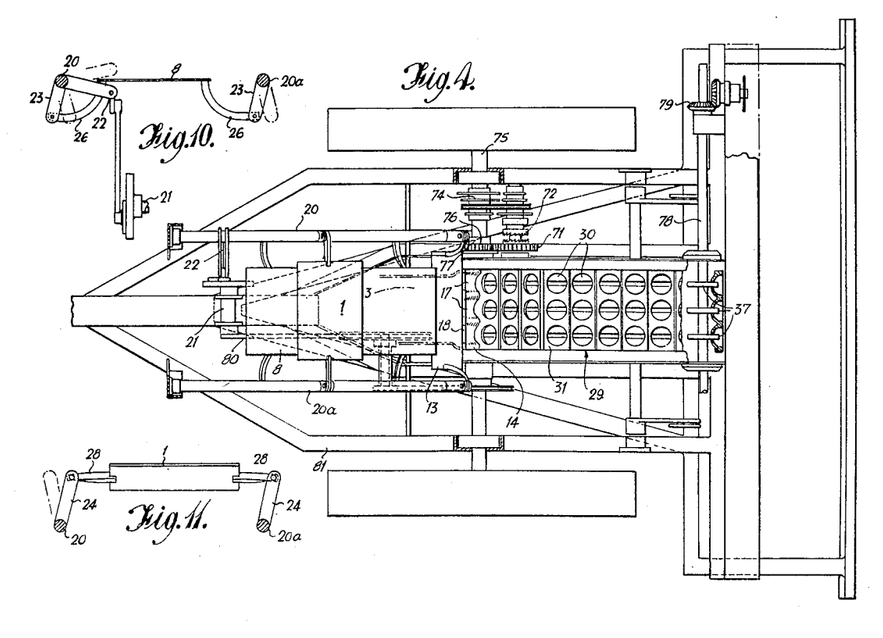
Figure 5:
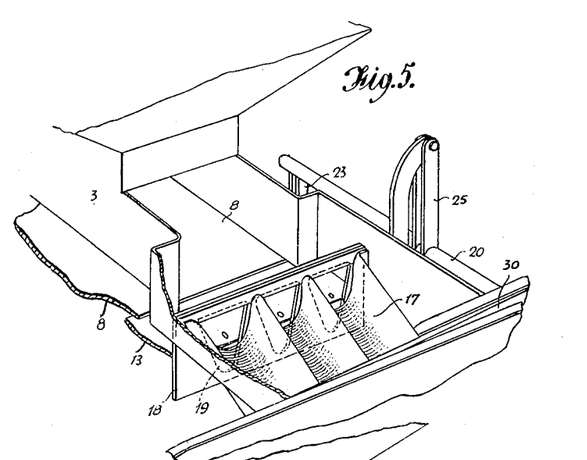
Fig. 5 is a perspective fragmentary view showing the discharge end of the trough and the chute leading the potatoes to the conveyor.

In the machine as illustrated, all the previously mentioned reciprocating plates, namely the bottom plate 1 of the hopper and the main and auxiliary bottom plates 8 and 13 of the trough are supported by and receive their motion from a pair of rocking shafts 20, 20a which are mounted in the main frame of the machine and extend one at each side of the trough 3 in the longitudinal direction thereof, shaft 20 being driven from a transverse shaft 21 through a crank drive 22 as best shown in Fig. 10. Each of the shafts 20, 20a has four radially extending lever arms, namely a pair of arms 23 which extend downwardly, and two oppositely directed arms 24 and 25.

The main bottom plate 8 of the trough 3 is provided near each end with downwardly extending bracket arms 26 which form with it a rigid structure, and the lower ends of which are pivotally connected to the lever arms 23, whereby a four-point suspension of the plate 8 is provided. The hopper bottom 1 and the auxiliary bottom plate 13 of the trough, being of shorter length, are each suspended by pivotal connection to one pair of lever arms only, namely 24 and 25 respectively. The lever arms 24 are pivoted to a pair of substantially horizontal extension arms 28, while the auxiliary trough bottom plate 13 has a pair of upstanding extension arms 27, which form with it a cradle-like rigid structure and are pivoted at their upper ends to the upper ends of the lever arms 25.

Owing to this construction the movement of the main trough bottom plate 8 will not only be in phase opposition to that of the hopper bottom 1 and of the auxiliary bottom plate 13 of the trough, but the paths of movement of the main and auxiliary bottom plates 8 and 13 are also curved oppositely so that there is a certain amount of relative vertical reciprocatory movement in addition to the horizontal one between the plates 8 and 13.

Preferably, the machine is constructed so that the potato flow is longitudinally of the machine, i. e., in the line of its travel over the land, and preferably also the potatoes are discharged rearwardly of the machine.

In a multiple-row machine, in which the potatoes arranged in lines by the above-mentioned discharge chute, the lines are distributed to transversely spaced points where they are discharged on to the ground. The illustrated arrangement for this purpose, the discharge chute terminates facing an upwardly inclined portion of an endless conveyor 29 which extends longitudinally and rearwardly of the machine and is provided with parallel lines of longitudinally spaced cup-like compartments or pockets 30, the number of lines corresponding to the number of channels 17 in the discharge chute 14 and being respectively aligned therewith, and each pocket 30 being of suitable size to receive one potato. This conveyor may be formed as shown of plates 3 linked together and trained over a front pair of sprockets 32 near the outlet end of the discharge chute, then over a pair of deflector sprockets 33 at a higher level and thence over a rear pair of sprockets 34 at an intermediate level so that the upper run of the conveyor, which carries the potatoes, is upwardly inclined, for example at about 35°, for a relatively short stretch including its pick-up point adjacent the discharge chute and leading to the deflector sprockets 33, this stretch being followed by a longer slightly downwardly inclined stretch leading to its discharge point where the conveyor 29 passes downwardly around the rear sprockets 34. The discharge chute 14, which preferably has a steeper inclination than the trough, may, as illustrated be substantially perpendicular to the conveyor 29 at the pick-up point. The conveyor plates 31 may be constructed of stampings or pressings, each plate being formed with a transverse line of depressions or cups constituting the pockets 30, one for each discharge chute channel 17, and the plates 31 may be connected by links 35 fastened over pins mounted on the plates 3, which pins may project beyond the links 35 to engage between the teeth of the conveyor sprockets 32, 33, 34.

It will be appreciated that as the conveyor plates pass over and downwardly around the rear sprockets 34, they will become tilted so that potatoes carried in their cups will or should fall away from the conveyor. In order to make sure that the potatoes do fall away, which might not otherwise occur with muddy potatoes which might adhere to the conveyor, the conveyor plates are preferably formed with longitudinal slots 36 in the bottoms of their cup-like pockets 30, and the rear sprocket axle carries discs or flanges 37 which preferably rotate with the sprockets 34 and which are disposed so that their peripheries are aligned with and will protrude through the slots 36 in the plates 31 as they pass successively over the rear sprockets 34, and will thereby lift the potatoes from the cups 30.

Potatoes from one longitudinal line of cups 30 in the conveyor 29 may be discharged therefrom directly on to the ground, e. g., through a vertical delivery chute 38 suitably mounted on the machine. The potatoes from the other lines are conveyed by subsidiary transverse endless conveyors to transversely spaced points corresponding to the spacing apart of the furrows along which the rows of potatoes are to be planted. In the case, for example, of the illustrated three-row machine, the centre line of potatoes is discharged directly from the conveyor 29 and chute 38 and the two outer lines of potatoes may fall respectively on to two subsidiary conveyors 39 having compartments to receive the individual potatoes and maintain them in spaced relationship, and each discharging the potatoes directly on to the ground, through a vertical delivery chute 40.

Each of the subsidiary conveyors 39 may for example comprise a chain of plate elements connected by links and carrying at suitable intervals partition elements 41, each subsidiary conveyor chain being guided transversely to the direction of the main conveyor 29 over two pairs of sprockets 42 and 43. The conveyors 39 are arranged to travel in such a direction as to move downwardly over the inner sprocket 42, from where the outer edges of the partition blades 41 move over guide plates 44 on which the potatoes rest during their outward movement while being carried along by the partitions 41, the latter being preferably slightly inclined, as shown, to ensure more steady movement of the potatoes. Over the delivery chutes 40 the guide plates 44 are provided with suitable delivery openings 40a as illustrated.

Each delivery chute 38 and 40 is arranged with its lower end a certain distance above and slightly to the rear of the upper edge of an associated pair of drill-forming shares 45, which latter are suspended on a transverse bar element 46 forming part of a tool frame 47, which has rearward extensions 48 to which further tools may be secured and is adapted to be raised and lowered by a hand lever mechanism 49. This lever therefore permits the depth of penetration of the tools to be adjusted and the tools to be raised as illustrated, to an inoperative position when the machine has to be moved from place to place, the arrangement of the lower ends of the chutes being such that as not to interfere with this up and down movement of the frame 47 and the drill forming shares 45. These shares in a plan view have more or less the profile of a sharpened U, and the potatoes are arranged to be delivered by the chutes 38 and 40 so as to fall into the space between the two sides of the U, where after the passage of the tool they will be covered by the earth falling back from the two sides of the drill. To facilitate this covering up, the shares 45 preferably are arranged, as illustrated, to penetrate deepest at their leading end so as to allow the earth to move inwardly at the bottom of the drill, even while the rear part of the side walls of the share still move past. The spacing of the partitions 41 on the subsidiary conveyors 39 is preferably such in relation to the relative rate of movement of the subsidiary and main conveyors 39 and 29 that each compartment between two successive partitions 41 is supplied with one potato by the main conveyor. In order to ensure that the potatoes leave each chute 40 at uniform intervals, even if due to bouncing on the partitions they arrive in the chutes at slightly irregular intervals, each of the chutes 40 (and, if desired, also chute 38) may be provided with a mechanically controlled closure device. This device may consist of a pair of flaps 50 normally held closed by a spring 51 and adapted to be opened, for example, by a toggle mechanism 52. The latter, may, as illustrated, be operated by a movable cam element 53 projecting through a suitable slot in the guide plate of the conveyor 39 and adapted to be pressed down to open the flaps 50, by the passage of each partition 41. The drill shares 45 for the outer rows may be laterally adjustable in the machine to vary the distance between the rows of potatoes. In order to allow the chutes 40 to follow this adjusting movement, the latter are preferably adjustably clamped in slots 54 provided in suitable wall elements and extending in the direction of movement of the subsidiary conveyors 39. In this case, as illustrated, the end part of the guide closing the under side of the compartments of the conveyor is formed as an auxiliary guide plate 55 separate from the main guide plate 44 and overlapping the end thereof, the auxiliary plates 55 being secured to the chutes 40 so as to take part in their adjusting movement, thus ensuring that the delivery opening 44a is adjusted together with the chute 40. The delivery control mechanism 50 to 53 is also mounted in this adjustable structure so as to take part in the adjusting movement of the delivery chute 40.

In an alternative arrangement, the subsidiary conveyors can be dispensed with by providing, in place of the multi-row longitudinal main conveyor 29 above described, a single-row longitudinal conveyor for each row to be planted, these conveyors being arranged with their pick-up points side by side adjacent the discharge chute from the trough, and the conveyors diverging rearwardly of the machine so that their discharge points are spaced transversely the required distances apart, each conveyor discharging the potatoes directly on to the ground, e. g., through a vertical delivery chute.

In a further alternative arrangement, the subsidiary conveyors can also be dispensed with and a multi-row main conveyor alone employed, by arranging it transversely of the machine with a suitable arrangement of the discharge chute so that its channels discharge into the respective rows of cups of the upper run of the conveyor, suitable guide plates being arranged along the lower run of the conveyor between its end sprockets so that the potatoes in the cups are carried round along the lower run to transversely spaced discharge points associated with the respective rows of cups along the lower run, at which points the conveyor discharges the potatoes from each row directly on to the ground, e. g., through a vertical delivery chute at each of those points.

Figures 6, 7:
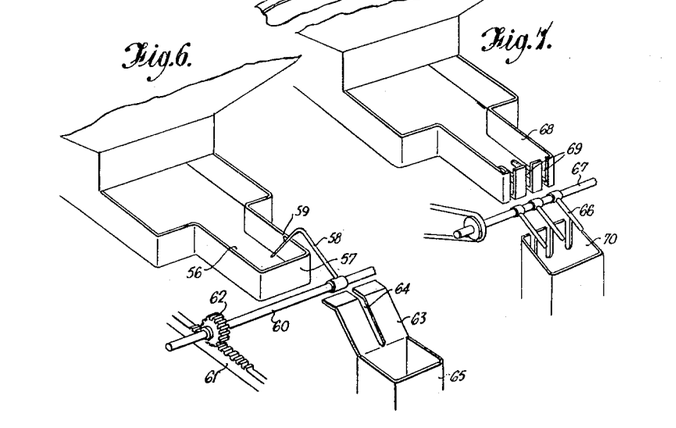
Figs. 6 and 7 are modifications thereof.
Figure 8:
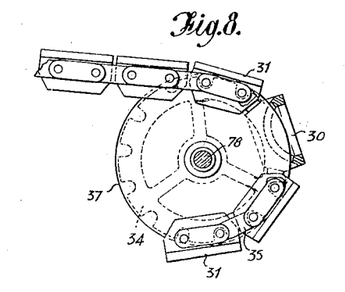
Fig. 8 shows the rear end of the main conveyor, partly in section.
Figure 9:
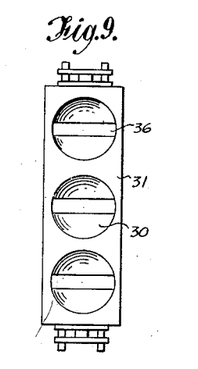
Fig. 9 is a plan view of one conveyor element.
Figures 13, 14:
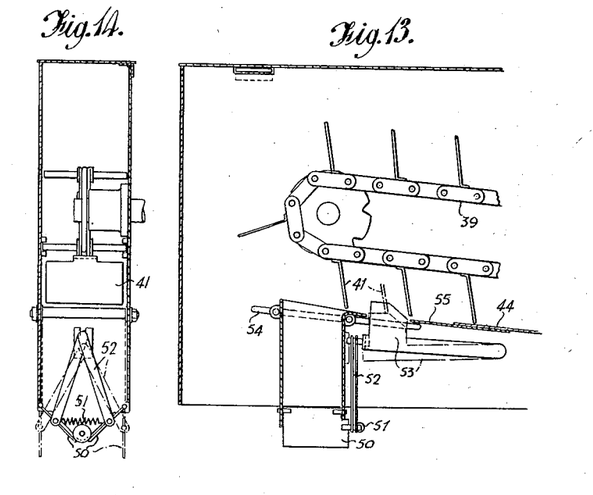
Fig. 13 is a section on line XIII—XIII of Fig. 4 showing the outer end of an auxiliary conveyor.
Fig. 14 is a section on line XIV—XIV of Fig. 13.

In a single-row machine, a conveyor having a single line of cups may be provided for conveying the potatoes from the trough or discharge chute earlier mentioned, rearwardly for discharge on to the ground, e. g., through a vertical delivery chute. Alternatively, such a conveyor can be dispensed with and a device may be provided at the discharge end of the trough or discharge chute, which is adapted to pick off one potato at a time and deliver it or allow it to drop directly to the ground e. g., through a vertical delivery chute. Two such arrangements are illustrated in Figs. 6 and 7 respectively. In the arrangement as illustrated in Fig. 6, at the discharge end of the trough there is provided a discharge chute having a single channel, as earlier mentioned, of a suitable width to admit the potatoes from the trough in single file, the lower end of the discharge chute having an end wall 57 or a stop so that the potatoes in the discharge chute 56 cannot fall out. An arm 58 carrying one or more prongs 59 may be arranged for oscillation on a transverse shaft 60 which may be driven by a reciprocatory rack 61 acting on a pinion 62 fixed on shaft 60, so that the pronged arm 58 is moved in an arc downwardly to spear the lowermost potato in the discharge chute, the motion of the arm then being reversed so that it picks up the speared potato and swings it over on to a stationary inclined stripper plate 63 or the like having a slot or opening 64 through which the arm 58 passes, whereby the stripper plate 63 arrests the potato while the pronged arm 58 continues to move and withdraws its prong or prongs from the potato which then rolls down the plate 63 and drops on to the ground, a vertical delivery chute 65 being preferably provided for this purpose. The rack bar 61 may take its drive from a suitable part of the mechanism provided for reciprocating the hopper and trough bottom plates earlier mentioned. In the arrangement shown in Fig. 7, instead of the oscillatory pronged arm there is provided a lifting and tilting platform which is constituted by bar elements 66 and is rotatable on a transverse shaft 67. This platform is arranged so as to come under and lift the lowermost potato out of a discharge chute 68, having a closed end provided with slots 69 for the passage of the bar elements 66, whereby as the platform rises, it becomes more and more tilted so that the potato falls away from the platform on to the ground. A vertical delivery chute 70 is preferably positioned to receive the potato as it rolls off the platform. This arrangement may lift one potato per revolution, or a transverse shaft may carry platforms extending radially therefrom so as to lift as many potatoes as there are platforms, in succession per revolution. In still another alternative arrangement, the lower end of the discharge chute may be open so as to discharge the line of potatoes, and an upright conveyor may be provided having a column of cups to receive the individual potatoes and discharge them on to the ground (if desired, through a vertical delivery chute) at a point of the conveyor run where the cups become inverted.

Alternatively to the provision of separate drill shares such as 45, the lower extremities of each vertical delivery chute may be suitably shaped to enable it to dig into the ground and prepare a furrow or furrows for receiving potatoes. Ridging tools resembling plough-shares may be arranged on the tool-carrier frame behind each delivery chute so as to follow up and plough the soil back into and over the furrow or furrows.

The machine is preferably constructed for towing by a vehicle such as a tractor, and so that the planting machinery is driven from the land wheels of the machine through a clutch. In the illustrated multi-row machine, a free gear 71 and a clutch 72 are provided on a shaft 73 driven through a variable ratio transmission 74 from the land wheel axle 75 so that the gear 71 can be clutched to the shaft 73 when the planting machinery is to be operated. Gear 71 meshes with a gear 76 fast on a sleeve 77 which surrounds the wheel axle 75 and serves as shaft for the front sprockets 32 of the longitudinal main conveyor 29. An extension of the rear sprocket shaft 78 of this conveyor carries bevel gears 79 driving the shafts carrying the outer sprockets 43 of the transverse subsidiary conveyors 39. From an extension of sleeve 77 carrying the front sprockets 32 of the main conveyor 29 a belt drive 80 is taken forwardly of the machine to the previously mentioned shaft 21, which through the drive 22 including a crank pin, a joint, and a lever arm, a connecting rod, drives the rocker shaft 20.

The machine may be constructed on a chassis frame 81 formed of longitudinal and transverse members, and the hopper structure, trough and its associated discharge chute may be supported on a framework 82 erected on the front end portion of the chassis frame 81. The conveyor or conveyors, may be mounted as illustrated on transverse shafts between upright side plates mounted on the rear portion of the chassis frame 81, the side plates for the longitudinal main conveyor being arranged longitudinally of the chassis frame and those of the subsidiary conveyors being disposed across the rear of the chassis frame as shown, and the side plates having the necessary bearings in which are journalled the various shafts of the driving mechanism. When constructed for towing, the machine may have a single pair of land wheels 83 mounted on the transverse land wheel axle 75 supported in bearings on the longitudinal members of the chassis frame, and a tow bar 84 may be secured to the front cross member of the chassis frame 81, or the longitudinal frame members may be extended forwardly and convergently to form the tow bar.

The machine may, however, also be constructed as a self-propelled vehicle, and in that case, the drive for the planting mechanism may be obtained from a shaft driven by the engine of the machine, instead of from the land wheel axle 75. The machine may, of course, also be provided with an additional, steerable land wheel or wheels at the front. With a sufficiently compact construction of the potato planting machine, which can readily be achieved more especially in a single-row machine, it may also be constructed for direct mounting, as an attachment, upon a vehicle such as a tractor, and it may be so adapted as to obtain its drive for the planting mechanism from a take-off power shaft on the vehicle to which it is fitted.

We claim:

1. In a potato planting machine, the combination of a hopper, a downwardly inclined shaker plate at and forming at least part of the bottom of said hopper, said plate being mounted for reciprocation transversely to its direction of inclination, said hopper having an outlet adjacent the bottom end of said shaker plate, a downwardly inclined trough having its upper end beneath said plate, said trough including stationary side walls and a transversely reciprocable shaker bottom plate, said hopper bottom shaker plate, said hopper outlet and said trough each having a transverse width sufficient to permit passage of several potatoes side by side, at least one downwardly inclined chute at the lower end of said trough and of transverse width to receive potatoes in single file, a gate at the upper end of said chute for regulating admission of potatoes from said trough into said chute, means associated with the lower end of said chute and movable past the same to pick off the lowermost potato in said chute at regular time intervals, means for driving said last-mentioned means, and means for reciprocating said shaker plates.

2. In a potato planting machine, the combination of a hopper, a transversely reciprocable downwardly inclined shaker plate at the bottom of said hopper, said hopper having an outlet adjacent the bottom end of said shaker plate, a downwardly inclined trough having its upper end beneath said plate and hopper outlet, said trough including stationary side walls and a transversely reciprocable shaker bottom plate, a plurality of chutes disposed side by side at the lower end of said trough and each of transverse width to receive a single file of potatoes, an adjustable gate at the upper ends of said chutes for regulating admission of potatoes thereinto from said trough, endless conveyor means having a row of spaced recesses for each chute mounted for movement beneath the lower end of said chutes to receive potatoes therein, one at a time from each chute, means associated with said conveyor means for guiding the discharge of potatoes from said recesses of each row, means for driving said conveyor means and means for reciprocating said shaker plates.

3. In a potato planting machine, the combination as claimed in claim 2, said means for reciprocating said shaker plates being means for reciprocating said plates in opposite phase.

4. In a potato planting machine, the combination of a hopper, a transversely reciprocable downwardly inclined shaker plate at the bottom of said hopper, said hopper having an outlet adjacent the bottom end of said shaker plate, a downwardly inclined trough having its upper end beneath said hopper outlet and said plate, said trough including stationary side walls, a main transversely reciprocable shaker bottom plate extending longitudinally of said trough from its upper end to a point spaced from but near the lower end of the trough and a relatively short auxiliary transversely reciprocable shaker bottom plate in series with said main bottom plate and extending from said point to the lower end of said trough, a downwardly inclined chute extending from the lower end of said trough and of transverse width to receive a single file of potatoes, means associated with the lower end of said chute and movable past the same to pick off the lowermost potato in said chute at regular time intervals, means for driving said last-mentioned means, and means for reciprocating said shaker plates in different phase relations.

5. In a potato planting machine, the combination as claimed in claim 4, said reciprocating means being means to reciprocate said hopper bottom shaker plate and said auxiliary trough bottom shaker plate in the same phase relation and each in opposite phase relation to the reciprocation of said trough main bottom plate.

6. In a potato planting machine, the combination as claimed in claim 4, said hopper bottom shaker plate and said trough being downwardly inclined in opposite directions and said chute being downwardly inclined in the same direction as said trough.

7. In a potato planting machine, the combination of a hopper, a transversely reciprocable downwardly inclined shaker plate at the bottom of said hopper, said hopper having an outlet adjacent the bottom end of said shaker plate, a downwardly inclined trough having its upper end beneath said hopper outlet and said plate, said trough including stationary side walls, a main transversely reciprocable shaker bottom plate extending longitudinally of said trough from its upper end to a point spaced from but near the lower end of the trough and a relatively short auxiliary transversely reciprocable shaker bottom plate in series with said main bottom plate and extending from said point to the lower end of said trough, a plurality of chutes disposed side by side at the lower end of said trough and each of transverse width to receive a single file of potatoes, an adjustable gate at the upper ends of said chutes for regulating admission of potatoes thereinto from said trough, endless conveyor means having a row of spaced recesses for each chute mounted for movement beneath the lower end of said chutes to receive potatoes therein, one at a time from each chute, means associated with said conveyor means for guiding the discharge of potatoes from said recesses of each row, means for driving said conveyor means, and means for reciprocating said shaker plates in different phase relations.

8. In a potato planting machine, the combination as claimed in claim 7, said reciprocating means being means to reciprocate said hopper bottom shaker plate and said auxiliary trough bottom shaker plate in the same phase relation and each in opposite phase relation to the reciprocation of said trough main bottom plate.

9. In a potato planting machine as claimed in claim 6, said hopper bottom shaker plate and said trough being downwardly inclined in opposite directions and said chutes being downwardly inclined in the same direction as said trough.

10. In a potato planting machine, the combination of a hopper, a transversely reciprocable downwardly inclined shaker plate at the bottom of said hopper, a movable plate forming part of said hopper opposite said shaker plate and defining therewith a hopper outlet, said movable plate being adjustable in position in relation to said shaker plate to vary the size of said outlet, a downwardly inclined trough having its upper end beneath said plates in said outlet, said trough being inclined in the opposite direction to said shaker plate and including stationary side walls, a relatively long main transversely reciprocable shaker bottom plate extending from the upper end of said trough downwards to a point spaced from but near the lower end of said trough and a relatively short auxiliary transversely reciprocable shaker bottom plate in series with said main bottom plate and extending from the lower end of the latter to the lower end of said trough, a downwardly inclined chute assembly extending downwardly in the same direction as said trough at the lower end of said trough and dimensioned transversely to receive potatoes in single file, a movable gate at the upper end of said chute for regulating admission of potatoes from said trough into said chute, means associated with the lower end of said chute and movable past the same to gether up the lowermost potato in the file in said chute at regular time intervals, means for driving said last-mentioned means, and means for reciprocating said shaker plates in different phase relations.

11. In a potato planting machine, the combination as claimed in claim 10, said reciprocating means being means to reciprocate said hopper bottom shaker plate and said auxiliary trough bottom shaker plate in the same phase relation and each in opposite phase relation to the reciprocation of said trough main bottom plate.

12. In a potato planting machine, the combination as claimed in claim 10, said potato gathering means including an endless conveyor having spaced recesses therein to receive potatoes, one at a time, from the lower end of said chute, said conveyor being mounted for movement beneath said lower end of said chute to rise therepast at an angle of slope such that a potato not retained in one of said recesses will roll down the conveyor slope towards the lower end of the chute, and means disposed in the path of said conveyor where its upper run changes its direction of travel to descend, for guiding the discharge of the potatoes from said recesses.

13. In a potato planting machine, the combination claimed in claim 12, said conveyor having apertures in the bottoms of said recesses, and ejector means disposed in the path of said apertures adjacent the point of discharge of the potatoes from said recesses for projecting through said apertures to dislodge the potatoes therein.

14. In a potato planting machine, the combination as claimed in claim 12, said means for guiding the discharge of potatoes from said recesses including a vertical delivery chute, a cut-off gate in said chute, and means for periodically opening said gate in timed relation with the discharge of potatoes, one at a time, into said chute for controlling the discharge of potatoes from said chute.

15. In a multi-row potato planting machine, the combination of a hopper, a downwardly inclined transversely reciprocable shaker plate at the bottom of said hopper, said hopper having an outlet adjacent the bottom end of said shaker plate, means for adjusting the size of said outlet, a downwardly inclined trough having its upper end beneath said plate and said outlet, said trough including stationary side walls, a relatively long main transversely reciprocable shaker bottom plate extending from the upper end of said trough to a point spaced from but near the lower end of said trough and a relatively short auxiliary shaker bottom plate in series with said main bottom plate and extending from the lower end of said main bottom plate to the lower end of said trough, a downwardly inclined chute structure at the lower end of said trough and forming a plurality of chutes, each of transverse width to receive a single file of potatoes, an adjustable gate structure at the upper end of said chute structure for regulating the admission of potatoes from said trough and to said chutes, an endless conveyor mounted for rising movement beneath the lower end of said chute structure, there being as many rows of spaced recesses in said conveyor as there are chutes and said rows registering with the lower ends of said chutes to receive potatoes one by one in said recesses of each row as the conveyor is moved upwardly past said chutes, means associated with said conveyor where its upper run changes its direction of travel to thereby discharge the potatoes from said recesses by gravity, for guiding the discharge of potatoes from said rows of recesses respectively to transversely spaced discharge points of the machine, means for driving said conveyor, and means for reciprocating said shaker plates in different phase relations.

16. In a potato planting machine, the combination as claimed in claim 15, said reciprocating means being means to reciprocate said hopper bottom shaker plate and said auxiliary trough bottom shaker plate in the same phase relation and each in opposite phase relation to the reciprocation of said trough main bottom plate.

17. In a potato planting machine, the combination as claimed in claim 15, said recesses having apertures in their bottoms, and ejector means disposed in the path of said apertures adjacent the point of discharge of the potatoes from said recesses for projecting through said apertures to dislodge the potatoes therein.

18. In a potato planting machine, the combination as claimed in claim 15, said means for guiding the discharge of potatoes from said conveyor including a vertical delivery chute registering with one row of said recesses for discharging potatoes from said row vertically and directly on to the ground, and secondary conveyor means disposed transversely of the machine for conveying potatoes from each other row of said recesses respectively to the other of said transversely spaced discharge points, and a vertical delivery chute at each of said other discharge points disposed to receive potatoes discharged from the associated secondary conveyor.

19. In a potato planting machine, the combination as claimed in claim 18, and further comprising a cut-off valve in each of said last-mentioned delivery chutes, said valve being normally closed, and means operable by movement of the secondary conveyor associated with the discharge chute for opening said valve in timed relation with the discharge of each potato into said chute by its associated secondary conveyor.

CHARLES BARNETT.
WILLIAM BARNETT.

REFERENCES CITED

The following references are of record in the file of this patent:

UNITED STATES PATENTS

| Number | Name | Date |
| --- | --- | --- |
| 280,184 | Jewell | June 26, 1883 |
| 781,310 | Steitz | Jan. 31, 1905 |
| 955,193 | Paulitsch | Apr. 19, 1910 |
| 1,075,040 | Kelly | Oct. 7, 1913 |
| 1,607,102 | Schutter | Nov. 16, 1926 |
| 2,315,204 | Holle | Mar. 30, 1943 |
| 2,462,276 | Mueller | Feb. 22, 1949 |
| 2,479,667 | Boylan | Aug. 23, 1949 |